INVENTORS
HANS G. FALTIN
EDWARD M. WIEST, SR.
BY
ATTORNEY

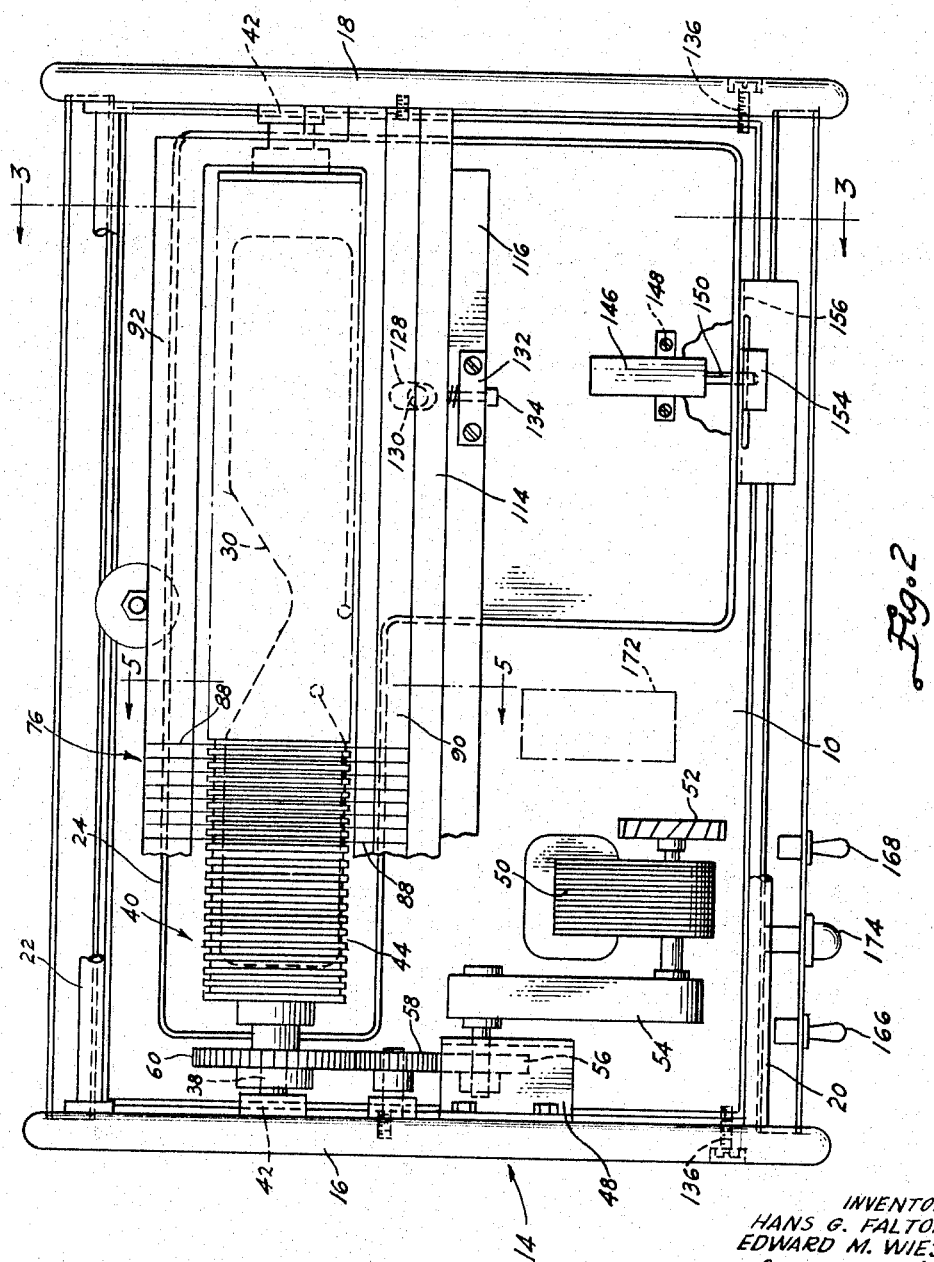

INVENTORS
HANS G. FALTIN
EDWARD M. WIEST, SR.
BY
ATTORNEY

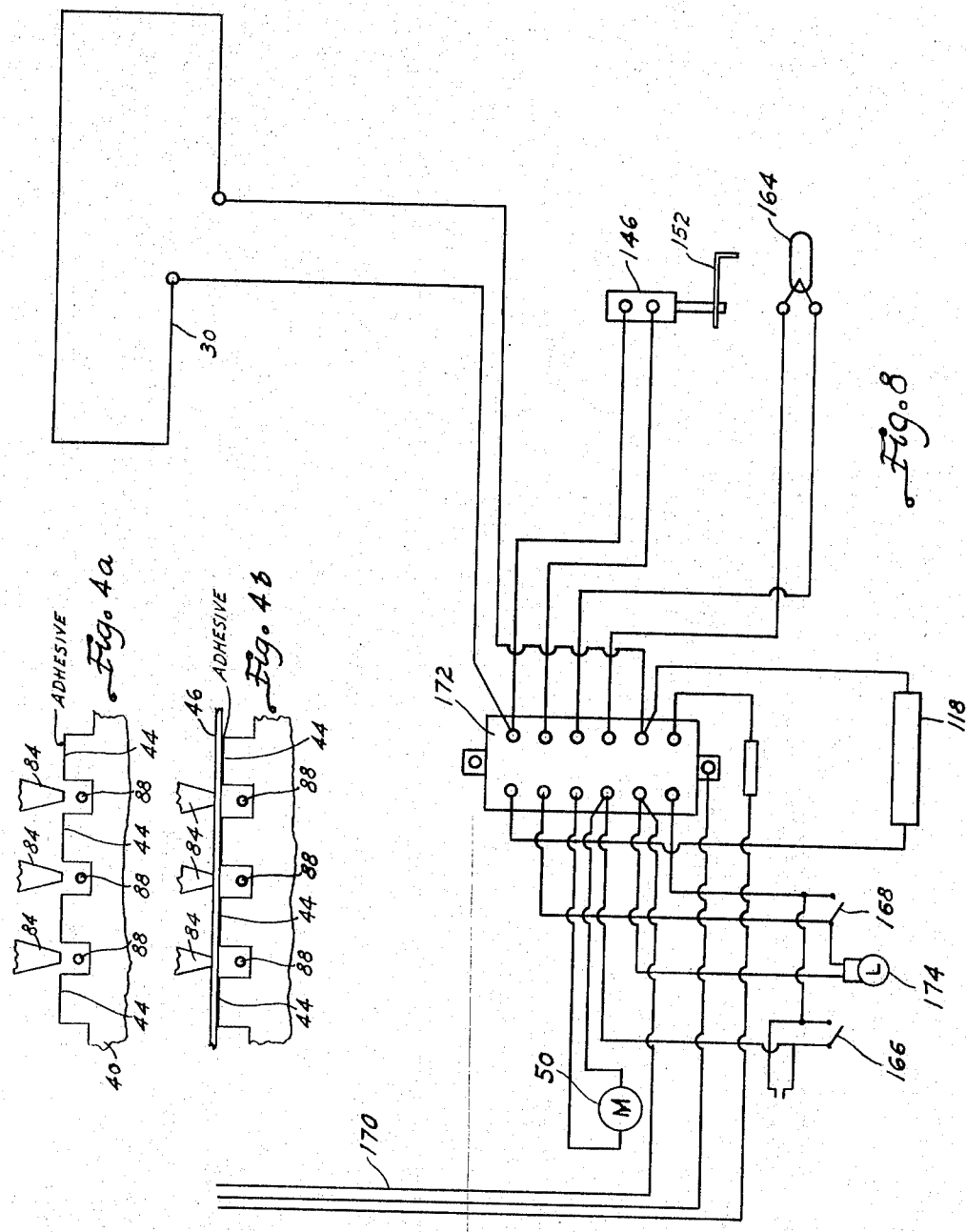

3,335,696
ADHESIVE APPLYING MACHINE
Hans G. Faltin, 4135 Wilshire Drive 17402, and Edward M. Wiest, Sr., 732 McKenzie St. 17403, both of York, Pa.
Filed Jan. 7, 1965, Ser. No. 424,022
9 Claims. (Cl. 118—5)

This invention relates to a machine for applying adhesive to one surface of pieces of sheet material such as plastic film, or paper, but without restriction thereto, for purposes of conditioning the same to be adhered to a supporting surface. In the preferred embodiment of the invention, the adhesive is applied in spaced stripes to said one surface of the sheet material to which it is applied, said stripes being relatively close together, particularly for purposes of permitting the application of adequate adhesive to relatively small pieces of sheet material or narrow strips thereof. Such adhesive may be applied by said machine to individual pieces of sheet material or substantially continuous strips thereof of indefinite length, if desired, and within the width limits of the machine. Though not restricted thereto, the machine particularly is adapted to apply pressure-sensitive wax as the adhesive.

In recent years, the preparation of mechanical paste-ups of photo composition, reproduction proofs, newspaper and magazine ad proofs, photographs and prints, and the like, has expanded to tremendous extents. One of the principal difficulties continually recurring in the preparation of material of this type however is that of neatly and easily applying adhesive to one surface of all of the components which are to be adhered to a supporting backing sheet for example, and preferably without restriction in size to the pieces or strips of material to which such adhesive is to be applied.

Particularly for want of something better to use, personnel engaged in the preparation of this type of material have resorted to the use of paste-pots, or available adhesive applying machines, all very similar in construction and of long standing design by which a continuous film of adhesive is affixed to one surface of the material.

These available machines, however, were basically designed for laminating leather, cardboard, and other rigid or semi-rigid materials. When thin, flexible and non-rigid materials, such as photographic paper, reproduction proofs, newsprint or other paper, film, etc. are run through these machines, slipping, bleed-through, adhesive build-up, etc. are encountered. Also, due to their coarse construction, when small pieces of material are passed through, they often are lost in the adhesive reservoir. Also, the pressure rollers of these machines usually tend to pick up adhesive and thus deposit the same on the face of the material, opposite to the surface to which the adhesive is being applied. Small pieces, less than two inches long, can not even be fed into these machines.

Another major difficulty of such available machines is that they usually employ a pair of pressure rolls spaced from each other and from the adhesive applying roll because the sheet material they are intended to coat normally is relatively stiff and will be urged into firm contact with the adhesive applying roll by such arrangement but such machines are inadequate to apply adhesive to readily flexible material because the pressure rolls cannot be brought into close enough relationship to the adhesive applying roll to insure the material picking up a coating of adhesive therefrom.

A further difficulty encountered in the attempted use of available adhesive applying machines for making mechanical pasteups has been the slowness with which the adhesive, especially when of a wax nature, is heated to sufficient fluidity that it can be applied, as desired, to one surface of pieces or strips of material when fed to the machine. In this regard, a number of machines currently used require as much as 1½ to 2 hours time to insure heating the adhesive to adequate temperature.

Still another difficulty generally encountered in available machines of the type described has been inadequate or cumbersome stripping mechanism to insure removal of adhesive coated pieces or strips of sheet material from the adhesive applying roll, and particularly small pieces of material, and such removal of the processed sheet material being in a manner which does not consistently cause a build-up of adhesive upon certain portions of the machine.

It is the principal object of the present invention to provide an adhesive applying machine of simple and compact design capable of applying adhesive to one surface of pieces or strips of sheet-like material of various thicknesses and textures and formed from various compositions, whether metallic or plastic foil or film, paper, or the like and regardless of size of such pieces or strips, all within reasonable limits, from approximately ½ inch square to pieces or strips as wide as the machine and of indefinite length, and insuring application of the adhesive intentionally to one surface of such pieces or strips only, while also providing highly effective pressure means to insure application of the adhesive to such single surface of the pieces or strips of sheet-like material through the inclusion of novel characteristics in the pressure means.

Another object of the invention is to overcome the long-standing difficulty of slow heating of the adhesive by so constructing the adhesive reservoir, heating means, and adhesive applying roll that even adhesive such as wax, in solid form when cold, is rendered fluid and capable of being applied to sheet-like material within a very short interval of time, such condition being maintained within very close temperature ranges by appropriate thermostatic controls.

Ancillary to the foregoing object is that of provision of auxiliary thermostatic controls which prevent the operation of the driving mechanism until the adhesive has been heated to desired operative temperature.

A further object of the invention is to provide simple but highly effective stripping means associated with the adhesive applying roll and so designed as to insure positive stripping of all types and sizes of sheet material fed to the machine, even pieces as small as ½ inch square, without danger of such pieces or strips being carried around into the adhesive reservoir by the adhesive applying roll or otherwise, the stripping means further being so designed as to insure discharge of coated pieces and strips of material from the machine without wiping the adhesive covered surface of the pieces or strips across any fixed parts of the machine except the stripping means.

Still another object of the invention is to provide appropriate automatically adjustable means to suitably relate the pressure means, comprising preferably a driven pressure roll, with respect to the adhesive applying roll which also preferably is positively driven, and at the same surface speed as the pressure roll, so as to insure adequate pressure and effective feeding of the sheet material without the possibility of applying adhesive to any portions of the pressure roll.

A still further object of the invention is to provide unique doctor blade means of compound construction to remove excessive adhesive from both the exterior of the adhesive applying roll, as well as the grooves therein, and being capable of adapting to variations in temperature so as to insure precisely accurate operation of the doctor blade means relative to the preferably grooved adhesive applying roll.

Details of the foregoing objects and of the invention as well as other objects thereof, are set forth in the following specification and illustrated in the accompanying drawings comprising a part thereof.

In the drawings:

FIG. 2 is a top plan view of the machine, on a larger scale than employed in FIG. 1, and illustrating the parts of the machine capable of being seen when the top cover and pressure roll, shown in FIG. 1, have been removed. In this figure, some of the parts have been broken away to facilitate the comprehension of other parts therebelow.

FIGS. 4a and 4b are enlarged diagrammatic fragmentary views of details.

FIG. 8 is a wiring diagram of the circuitry by which the machine is driven and the temperatures of the adhesive are controlled.

Figure 1:
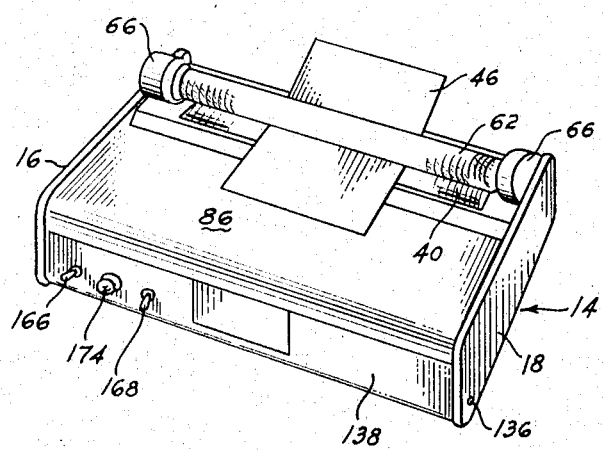
FIG. 1 is a perspective view of an adhesive applying machine embodying the principles of the present invention and illustrated in process of a piece of sheet material being passed through the machine for purposes of having adhesive applied to the undersurface thereof, as illustrated in said figure.

Referring to the drawings, the machine, in its preferred construction, comprises a base 10 which, for simplicity, may be made from appropriate sheet metal of suitable gauge, or cast, and is pan-like in shape both for rigidity as well as furnishing support means for certain elements to be described. Preferably, the base 10 may have a plurality of supporting buttons 12 extending downwardly from the lower surface thereof. The base 10 normally is supported upon a suitable horizontal surface and, during use, is stationary. Supported by the base 10 is a frame 14 comprising a plurality of similar side plates 16 and 18 which are interconnected primarily by a pair of spacing rods 20 and 22, respectively adjacent the front and back of the frame, which extend between the inner surfaces of the side plates thereof and are firmly fixed thereto by suitable screws or the like.

The frame 14 supports all of the movable, operative structure of the machine and especially the driven rolls to be described in detail hereinafter. Fixed to the base 10 and supported thereby is a pan-like heater support 24, the bottom of which is preferably spaced above the base 10 by means of appropriate brackets 26 or the like. As seen from FIG. 2, the heater support 24 is somewhat L-shaped and the bottom is appropriately lined with insulating material such as a sheet of asbestos.

Arranged within the heater support 24 is a plurality of electrical insulator type supports 28, formed from suitable material such as porcelain or the like, for purposes of supporting an electric resistance heater element 30, such as that employed in many domestic appliances and various types of electric heaters. The heater element 30 is connected suitably in an electric circuit, to be described hereinafter. As shown diagrammatically in FIG. 2, it will be seen that the heater element 30, which is represented simply by a dotted line in said figure, preferably is disposed entirely within the elongated portion of the heater support extending substantially from end to end of the base 10.

An adhesive reservoir 32, which preferably is formed from suitable material of high heat conductivity, such as aluminum or the like, has a shape in plan view complementary to the heater support 24 and fits directly thereover for support thereby. For purposes of aligning the same with said support as well as conserving heat, the lower perimeter of the adhesive reservoir 32 has a depending circumferential skirt 34, see FIG. 4, which overlies the exterior of the upper portions of heater support 24. As clearly shown in FIGS. 2 and 3, the reservoir 32 has reasonable depth and, being complementary to heater support 24, also is L-shaped in plan view, for purposes to be described.

Especially in view of the mounting of the heater element 30 directly below the elongated portion of the adhesive reservoir 32, the high terminal conductivity of the material from which the reservoir is formed, and the closure-like relationship of the reservoir with respect to the heater support 24, very efficient heating of the adhesive 36 within the reservoir occurs with minimum current consumption. Maximum control of the temperature of the adhesive within very close limits also is made possible, for example, of the order of as little as approximately 2° F. Such control is effected by thermostatic means uniquely positioned and described in detail hereinafter.

Supported by the frame 14, is a shaft 38 affixed to an adhesive distributor roll 40, the opposite ends of the shaft 38 being supported in preferably anti-friction bearings 42 which are mounted in the opposite side plates 16 and 18. The roller 40 is provided with evenly spaced circumferential grooves 44 of suitable depth to provide annular ribs therebetween which preferably resembly the shape of Acme threads. Vertically, the bearings 42 are so positioned in the side plates 16 and 18 that the lower portion of the roll 40 is disposed below the upper edges of the adhesive reservoir 32 an appreciable extent to insure engagement with adhesive therein as can readily be appreciated from FIGS. 3–5. The roll is driven by means to be described, at a desired rate of speed, whereby the roll continually becomes coated with fluid adhesive, such as suitable wax of appropriate tacky consistency, though not restricted to such material. Doctor blade means, details of which are described hereinafter, effect an even application of adhesive to the periphery of the roll 40, and especially the annular ribs thereon, for application to either pieces or continuous strips of sheet material as illustrated in exemplary manner by piece 46 in FIG. 1.

Also carried by the frame 14, such as upon side plate 16, is a bracket 48 which supports an electric motor 50 somewhat diagrammatically illustrated in FIG. 2. To maintain the motor 50, while operating, at suitable temperature, any appropriate means such as a fan 52 is affixed thereto to cause a circulation of ambient air. The motor 50, through a suitable gear box 54, drives gear 56 which meshes with intermediate gear 58, said gear meshing with driven gear 60 which is fixed to shaft 38 of adhesive distributor roll 40 so as to positively rotate the same at a desired rate of speed.

Figure 3:
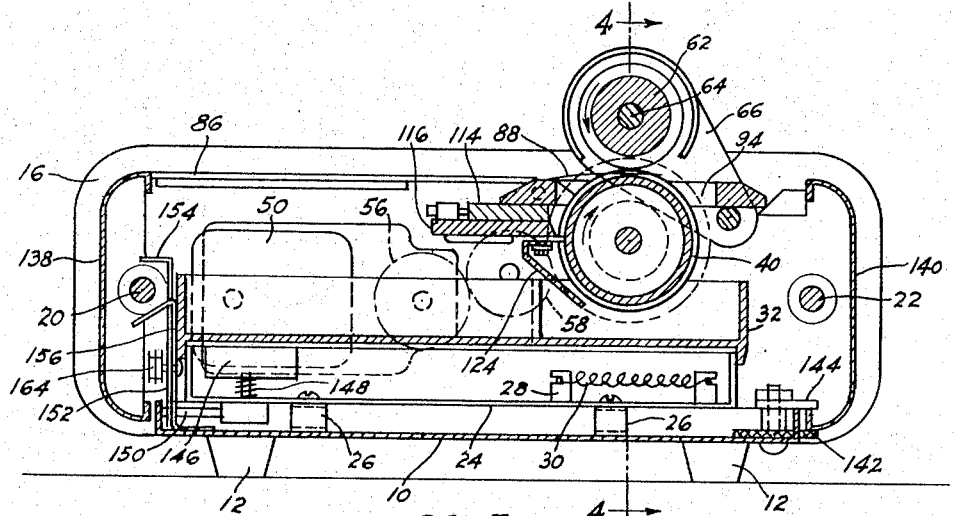
FIG. 3 is a vertical sectional view of the machine illustrated in FIG. 2, as seen on the line 3—3 thereof, but with the top cover and pressure roll structure being illustrated therein.

Cooperating with the adhesive distributor roll 40 is a pressure roll 62 which is fixed to shaft 64 extending between pivotally supported, cantilever arms 66 by means of anti-friction bearings 68 mounted therein. Fixed to one end of shaft 64 is a driven gear 70, see FIG. 4, which meshes with gear 60 that drives roll 40, whereby it will be seen that the adhesive applying roll 40 and pressure roll 62 are rotated in unison, at the same surface speeds, in opposite rotary directions, as indicated in FIGS. 3 and 5. The interengaging teeth of the gears 60 and 70 preferably are of such length that limited separation of the roll 62 from roll 40 is possible without disengaging the driving relationship of gear 60 with respect to gear 70.

Preferably for purposes of providing quiet operation of the machine, the gears 56, 58, 60 and 70 may be formed appropriately from synthetic resin such as "Nylon" or the like which is of a self-lubricating nature, durable and hightly suitable for such purposes.

The ends of the cantilever arms 66 opposite those which support the shaft 64 respectively are fixed to a transversely extending shaft 72, see FIGS. 3 and 5, the opposite ends of said shaft being suitably mounted in appropriate means such as sockets extending into the side plates 16 and 18 from the inner surfaces thereof. Preferably, the cantilever arms 66 are keyed to the shaft 72, as shown in FIG. 5, the key 74 preferably being of slightly less thickness than the width of one of the keyways formed either in the shaft 72 or arms 76, whereby a slight amount of pivotal movement may occur between the arms 66 and shaft 72. This arrangement permits the cantilever arms 66 to move correspondingly with respect to each other for purposes of affording a limited amount of floating movement of the opposite ends of the pressure roll 62 with respect to the distributor roll 40 for purposes of accommodating the pressure roll to different thicknesses of sheet material or the like when passed between the rolls 40 and 62. If desired to lift the pressure roll substantially away from the distributor roll, one or the other of arms 66 may be lifted to effect such movement after such limited independent movement of the arms has been exceeded.

Movement of the pressure roll 62 with respect to the adhesive applying roll 40 is adjustably limited by suitable stop means best illustrated in FIG. 5. Adjacent opposite sides of the frame 14, and preferably on the opposite side members of a stripping frame 76, are sloping surfaces 78 which receive the projecting ends of adjustable stop means such as screws 80 threaded into the lower surfaces of arms 66 and each maintained in adjusted position by lock nuts 82. The adjustable limiting of the movement of pressure roll 62 with respect to the adhesive applying roll 40 is highly desirable in order to provide one of the outstanding advantages of the present invention which renders it far superior to existing adhesive applying machine presently available, as follows.

Figure 4:
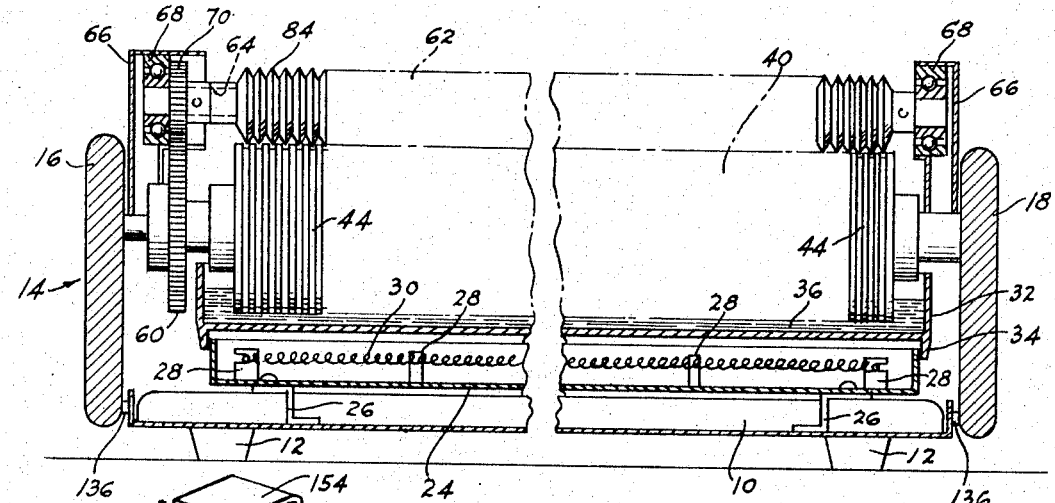
FIG. 4 is a horizontally foreshortened vertical elevation of the machine shown in FIG. 3 as seen on the line 4—4 thereof.
Figure 5:
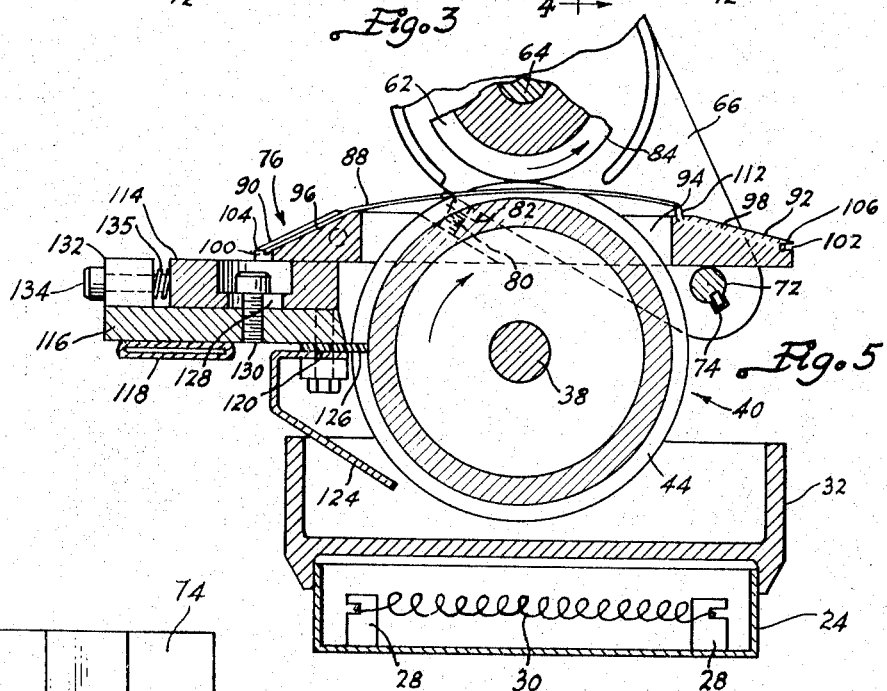
FIG. 5 is a fragmentary vertical sectional elevation, on a larger scale than in the preceding figures, and showing details of the doctor blade means and adhesive applying roll generally as seen on the line 5—5 of FIG. 2.

Particularly from FIG. 4, it will be seen that the pressure roll 62 is grooved circumferentially at even intervals and, in the preferred construction of the machine, such grooved arrangement provides a series of evenly spaced, V-shaped annular ridges 84, preferably having very narrow flat crests, which are positioned accurately in axial direction respectively intermediately of the grooves 44 in adhesive distributor roll 40 as clearly shown in FIG. 4. Such shape of said crests prevents any marking or marring of the upper surfaces of the material being processed. The spacing of the grooves 44 in roll 40 is identical with that of the spacing of the annular ridges 84 and the width of the grooves 84 is adequate, with respect to the crest portions of the ridges 84 particularly, so that, in conjunction with the limited movement assured by stop screws 80, physical contact between any portions of the surfaces of rolls 40 and 62 cannot occur, regardless of whether material is being passed between said rolls or the machine is operating idly.

In the preferred construction of the machine, the pressure roll 62 is positioned in operative relationship with respect to adhesive distributing roll 40 by gravity. This is made possible by the angular disposition of the cantilever arms 66, as shown in FIGS. 3 and 5, with respect to the axis of shaft 38. Due to the length of the arms and the spacing of the shaft 72 from shaft 38, it will be seen that the axis of shaft 64 of the pressure roll is substantially directly vertically above shaft 38 of the adhesive distributor roll 40. Hence, when a piece or strip of sheet material to be coated on the lower surface thereof with adhesive is to be passed through the machine, from the left to the right as viewed in FIGS. 3 and 5, the sheet is placed upon top cover plate 86, carried by frame 14 and extending between the side plates 16 and 18, and is pushed into the nip between roll 40 and pressure roll 62, to effect a positive, evenly driven feed of the material between said rolls as well as insuring positive contact of the material with the adhesive on roll 40.

When feeding film or sheet material, such as paper or the like, to these rolls, it is preferred that the circumference of the crests of the annular ridges 84 shall be substantially even, in an axial direction with the circumference of the annular ribs between the spaces 44 of adhesive distributor roll 40 as illustrated in FIGS. 3 and 5 particularly. Actual physical contact between said ridges and annular ribs should never occur. Such arrangement will insure adequate pressing of the sheet material against the periphery of the annular ribs between the spaces 44 of roll 40 and, depending upon the thickness of the sheet material, the floating type mounting of the pressure roll 62, afforded by the cantilever arms 66, and the positive drive of the rolls 40 and 62, readily accommodates the annular ridges 84 of the pressure roll to the upper surface of the sheet material without any appreciable crenelation thereof. To appreciate the cooperation of the crests of ridges 84 with the material and the relative position and function thereof relative to roll 40 and grooves 44 therein, note FIG. 4a where no sheet material is present, and FIG. 4b wherein sheet 46 is passing between the rolls.

Even though there may be variations in thickness of the material in a direction parallel to the axis of the roll 64, or if several pieces of somewhat different thickness, in side by side relationship, are passed between the rolls simultaneously, such limited floating movement of the roll 62 with respect to the roll 40 will insure adequate pressure of the material against the roll 40 by the weight of pressure roll 62. Especially in view of the fact that the shaft 72 which supports the pressure roll 62 is forwardly of the roll 40, the pressure roll 62 readily will yield, automatically and without any adjustment, to accommodate the same to any reasonable variations in thickness of material being passed between the rolls 40 and 62.

Figure 6:
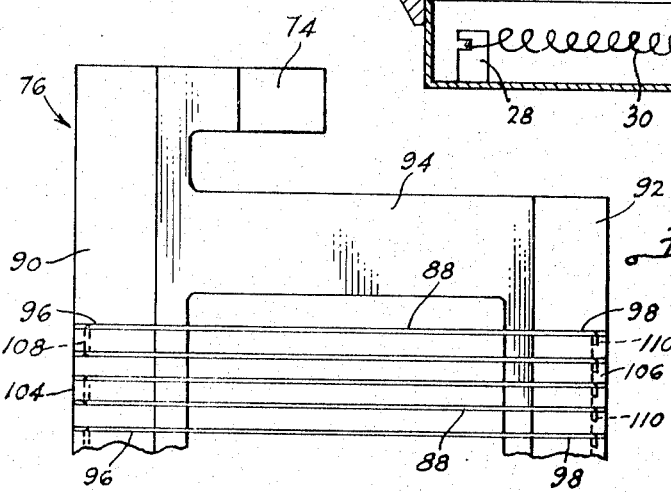
FIG. 6 is a fragmentary plan view of one end of the stripping mechanism illustrated in FIG. 5.

Simple but highly effective stripping means are provided to insure the separation of pieces or strips of sheet-like material from the periphery of the annular ribs on roll 40 between the grooves 44 after adhesive material has been applied to the lower surfaces of such pieces or strips. Said stripping means preferably comprise parallel, relatively stiff wires 88 which extend transversely to the axes of shafts 38 and 64. The opposite ends of said wires are supported respectively by the fore and aft, parallel frame bars 90 and 92 of stripper frame 76. The preferred shape of these bars is as illustrated in FIGS. 3 and 6, said bars being rigidly connected by end bars 94. The opposite ends of bar 90 are tapped at 91, see FIGS. 5 and 6, to fix the same to said plates 16 and 18 to prevent movement of frame 76 in feeding direction relative to the machine and the bar 92 rests upon shaft 72 for support.

The fore and aft frame bars 90 and 92 are provided with longitudinally aligned slots 96 and 98 within which the opposite ends of the wires 88 extend and the outer edges of the bars 90 and 92 are undercut by means of longitudinal grooves 100 and 102 for purposes of providing oppositely extending projections adjacent the upper surfaces of the bars 90 and 92 at the outer edges thereof. Said projections 104 and 106, see FIGS. 5 and 6, comprise the attaching means for the wires 88. To accomplish this, it will be seen that the wires 88 preferably are formed in pairs, these being connected at one end by a bight 108 which each extend under one of the projections 104, while the opposite ends of the wires 88 are bent transversely to provide lateral extensions 110, see FIG. 6, which snap beneath the projections 106.

As best shown in FIGS. 3 and 5, it will be seen that the intermediate portions of the wires 88 are bowed upwardly and ride within the grooves 44 of adhesive distributor roll 40 and thereby are substantially tangential to said roll. Such upward bowing of the wires 88 provides the means for attaching the wires to the frame 76, as when the intermediate portions of the bowed wires are depressed, thereby lengthening the opposite ends of the wires, and snapping the same beneath the projections 104 and 106 is possible. Preferably, wires 88 do not touch any of the surfaces defining grooves 44, as can be seen from FIGS. 4a and 4b.

The wires 88 are preferably relatively stiff, piano wire being a suitable type of wire to employ in forming said stripping members. Also, it will be noted especially from FIG. 5, that the right-hand end portions of said wires have similar, downwardly extending offsets 112 therein, whereby as a piece or strip of sheet material passes beneath the pressure roll 62 while having adhesive applied to the lower surface thereof by roll 40, the leading edge of said piece or strip will engage the relatively closely spaced wires 88 so as to insure separation of the coated piece or strip from the roll 40. As said pieces or strips slide along the trailing or delivery end portions of wires 88, they will reach the offset 112 and then pass out into space for engagement by the operator. The offsets 112 thus prevent the coated material from engaging the frame bar 92, for example, or any other portion of the machine than wires 88, thereby maintaining the apparatus in maximum operative condition with no build-up or accumulation of adhesive.

Even sheet material which is quite thin and relatively flexible may be coated on one surface thereof with adhesive by use of the machine comprising the present invention. Under such circumstances, the close spacing of the ridges 84 of pressure roll 62, axially, and the corresponding close spacing of the grooves 44 in roll 40, affords such closely spaced pressure points upon opposite surfaces of the material that the resulting engagement approaches that of a cylindrical, non-grooved roll but with added advantages thereover. This structure, coupled with the above described radial positioning of rolls 40 and 62 relative to each other, as illustrated in detail especially in FIGS. 4a and 4b, results in positive feeding even of thin material, without crenelating or flexing the material due to the upper surface thereof being engaged by the annular ridges 84 of roll 62.

The preferably relatively close spacing of the wires 88 likewise assures positive stripping of such coated material from the distributor roll 40 without damage to the material, either when processing thin, flexible material or relatively stiff material.

In the preferred construction, the roll 40 is made from material having relatively high thermal-conductivity, such as aluminum or the like. This results in the roller readily maintaining an even temperature throughout under all conditions of operation. Similarly, and especially for purposes of minimizing the weight of the entire machine, as well as rendering the same non-corrosive to atmospheric conditions, the pressure roller 62 preferably also is formed from aluminum or the like. If desired however, roll 62 may be formed from any other appropriate material including being molded from synthetic resin of suitable stability.

To insure the application of stripes of adhesive of only minimum thickness to the lower surfaces of pieces or strips of sheet-like material while passing over roll 40, doctor blade means of novel construction are embodied in the machine. In this regard, attention is directed especially to FIG. 5 wherein is shown a transversely extending support bar 114 which is fixed to the machine by being connected at the opposite ends thereof to the side plates 16 and 18 and is positioned adjacent the upwardly moving side of distributor roll 40. Screws extending in from the side plates of the machine may be employed to secure the support bar 114 as aforesaid.

Adjustably supported by frame 14 for movement toward and from the axis of shaft 38 or roll 40, is a doctor blade 116 which, on the undersurface thereof, has a heater 118, of the electric resistance type for example. The operative, scraping edge of blade 116 is sloped, as shown in FIG. 5. Clamped to the operative edge of doctor blade 116 nearest the roll 40 is a doctor blade comb 120 which, in the preferred construction, is a strip of suitable synthetic resin of the self-lubricating type, several appropriate brands of which are available under the trademarks "Teflon" and "Mylar."

The comb 120 has a series of somewhat flexible teeth 126 spaced according to grooves 44 of roll 40 and respectively disposed therein to scrape excess adhesive therefrom. Said comb is clamped against the lower surface of bar 116 by a clamping plate 122 which also is provided with a depending and inwardly extending terminal portion 124 which serves as a deflector or chute to direct excess adhesive back into the reservoir 32 as removed from the roll 40 by the fingers of comb 120 and the doctor blade.

The teeth 126 of comb 120 are reasonably complementary in width to the width of the grooves 44 so as to be effective in removing at least most of the adhesive from said grooves as the roll 40 rotates in the direction of the arrow shown in FIGS. 3 and 5, so as not to permit any excess adhesive being carried past doctor blade 116 by roll 40. Since the teeth 126 are integral with and formed from the same material as the comb strip 120, and particularly since the same are relatively narrow, said teeth are reasonably flexible and readily accommodate themselves to the grooves 44 regardless of whether the roll 40 is subjected to expansion and contraction longitudinally from heat transmitted thereto by the heated adhesive within the reservoir 32. If desired, especially if roll 40 is made of aluminum, it may be suitably surface-treated such as by being anodized.

Precise adjustability of the doctor blade 116 and the comb strip 120 carried thereby toward and from the roll 40 is made possible by the provision of two slots 128 formed in the support bar 114 for purposes of receiving clamping screws 130. Fixed to the outer edge of bar 116 is a pair of upstanding members or blocks 132 through which adjusting bolts 134 extend for rotation. The inner ends of said bolts are threaded into the support bar 114. Mounted upon said bolts between the bars 114 and 132 are compression springs 135. When the clamping screws 130 are loosened, rotation of the adjusting bolts 134 in the appropriate directions will result in very accurate positioning of the doctor blade 116 and comb strip 120 relative to the periphery of roll 40 and grooves therein so as to effect very precise removal of excess adhesive especially from the peripheral surfaces of the annular ribs between the grooves 44 in roll 40 as well as from grooves 44 by teeth 126. Following such adjustment, the clamping screws 130 are tightened to maintain the adjusted position of the doctor blade means.

The frame 14 and all of the movable elements of the machine supported thereby are capable of being pivotally moved relative to base 10 by the provision of suitable pivot bolts 136, see FIGS. 1 and 2, adjacent the lower edge of the front plate 138 of frame 14. The rear or trailing face of frame 14 has a back plate 140 thereon, see FIG. 3. Rotatably supported within the base 10 adjacent the lower edge of back plate 140 is a rotatable knob 142 which is connected to a locking latch 144, see FIG. 3, engageable with a terminal edge of the back plate 140 to lock the frame 14 against pivotal movement with respect to base 10. The frame and mechanism carried thereby is of such weight that it readily may be pivotally moved about the axes of pivot bolts 136 so as to elevate the roll 40 substantially above the adhesive reservoir 32, especially for purposes of removing the reservoir for cleaning or substituting one reservoir for another having a different type of adhesive therein. If desired, a suitable pivoted prop, or the like, not shown, may be employed to maintain the frame in such elevated condition while servicing the reservoir, heater mechanism, or the like, as required.

Effective heating of the adhesive within reservoir 32 is accomplished quickly, especially when intially conditioning the machine for operation, due particularly to the relationship and positioning of the heating element 30 with respect to the reservoir, which element is directly below and is substantially co-extensive with the distributor roll 40. Also of great importance in achieving such rapid initial heating of the adhesive is the thermostatic control system comprising a thermostatic switch 146 which is supported suitably, such as by the heater support 24, preferably in a portion thereof which is designed to be remote from the heater element 30, as can be best seen from FIG. 2. The theromstatic switch 146 preferably is a readily obtainable commercial one of the contact type and the heat-sensitive portion thereof is urged against the lower surface of reservoir 32 by appropriate means such as springs 148, see FIG. 3, which constantly urge the thermostatic switch 146 upwardly into engagement with the reservoir.

Figure 7:
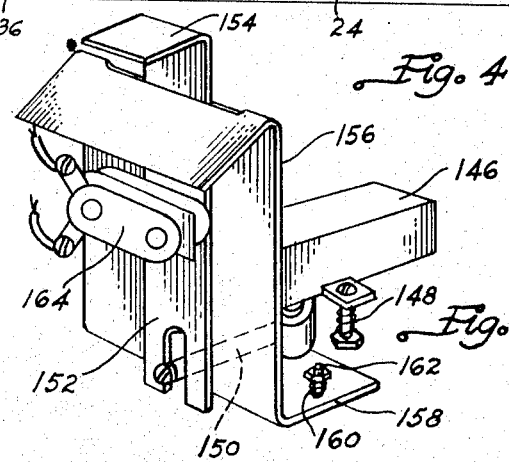
FIG. 7 is a perspective view, on an enlarged scale, showing the several thermostatic control means employed for purposes of controlling the operation of the driving means with relation to the temperature of the adhesive and also for maintaining the adhesive at desired temperatures within reasonably close limits.

Adjustability of the thermostatic switch, to accommodate the machine to use with various types of adhesives which may be varying melting points within relatively wide limits, is permitted by means of a rotatable arm 150. The outer end of this arm is engageable by the lower end of a pivoted lever 152 having a finger-engageable ear 154 thereon for manual adjustment of the theromstatic switch 146. The lever 154 is carried by a plate 156 extending upward from a horizontal flange 158, see FIG. 7, which rests upon the upper surface of frame plate 10 as shown in FIG. 3. Springs 160, which surround bolts 162 extending upwardly through bottom frame plate 10 permit a limited amount of rocking movement of the vertical plate 156 toward and from the adjacent side of the reservoir 32 as can best be seen from FIG. 3, and insure firm contact of said plate 156 with reservoir 32 so as to be directly responsive to the temperature thereof, for the following reason.

Mounted upon the vertical plate 156 is a normally open type thermostatic switch 164 which, through direct engagement of plate 156 with one side of reservoir 32, as constantly maintained by springs 160, transmits the temperature of the reservoir, and correspondingly of the adhesive therein, to the thermostatic switch 164. The latter is connected in the circuit of motor 50 and is adjustable to be operable to close at a predetermined temperature. The temperature at which thermostatic switch 164 is set is that at which the motor 50 is to start operating after thermostatic switch 146 has functioned to insure that the adhesive is fluid at operative temperature.

From the foregoing, it will be seen that the thermostatic switch 146 functions first, initially to bring the adhesive to operative temperature and, secondly, to maintain the adhesive at that temperature within reasonable limits. Thus, at the initial operation of the machine, the thermostatic switch 146 functions to establish a circuit continuously through heater 30 until it brings the adhesive to working temperature. Prior to such temperature being reached, thermostatic switch 164 remains open and motor 50 cannot start to operate rolls 40 and 62. Quick heating of the adhesive is assured by two main features, the high thermal conductivity of reservoir 32 and the location of thermostatic switch 146 to engage the remote offest of reservoir 32, readily seen in FIG. 2. By the time the heat from heater 30 migrates through the remote portion of reservoir 32 so as to raise the temperature thereof to that for which thermostatic switch 146 has been set as its upper limit at which it opens, the adhesive has become sufficiently fluid and the temperature for which thermostatic switch 164 has been set to close likewise has been reached so that motor 50 can start.

An exemplary circuit for the electrical system of the machine is illustrated in diagrammatic form in FIG. 8. By reference to this figure as well as to FIG. 1, it will be seen that the machine is provided with two switches 166 and 168. The line 170 is connected to a suitable source of power, such as 110 v., 60 cycle current. A terminal block 172 is supported by base plate 10 and all conduits of the circuit are connected thereto.

When the machine is to be conditioned initially for operation, the switch 168 is closed to complete the circuit to the heater element 30 for purposes of quickly bringing the temperature of the adhesive therein to the desired operative range. No difficulty has been found in achieving this in as little as ten minutes. When this temperature is reached, the thermostatic switch 146 will commence to cycle to maintain the adhesive within a very close range of temperatures for which it has been set.

Until said operative temperature range is reached however, the thermostat 164 will maintain the circuit to the motor open and even though attempt is made to start the motor, such as by closing switch 166, the circuit to the motor cannot be closed until the setting of the thermostatic switch 164 is satsified by the temperature of the adhesive in the reservoir. However, when said temperature has been satisfied, the operation of the machine then may take place by closing the switch 166 which remains closed as long as operation of the rolls 40 and 62 is desired.

Maintenance of the temperature of the adhesive within close limits is achieved by thermostatic switch 146. Further, heater 118 affixed to the doctor blade likewise is operated when the circuit is completed to the heater element 30 beneath the adhesive reservoir. Through the employment of such heater 118, no chilling of the adhesive will occur, especially at the commencement of operation of the machine, when the roll 40 commences to revolve and elevates wax to the doctor blade. Preferably however, the temperature produced in the doctor blade by heater 118 is slightly below that at which the adhesive is maintained. The circuit also includes a pilot light 174 which is a visible means of indicating when the heater circuit is "ON," so that an operator will know the machine is operative.

Replenishment of adhesive and observance of the condition thereof in reservoir 32 is accomplished simply by lifting top cover plate 86 which rests by gravity upon the upper portion of frame 14. Adequate access thus is obtained to the reservoir 32.

While the adhesive applying machine described above and set forth in the appended claims has included certain heating structure and control means to render normally solid or very viscous adhesive readily fluid for application to one surface of pieces or strips of sheet material, it is to be understood that the basic structure of the machine, especially the adhesive applying and pressure rolls and the supporting and drive means therefor, as well as the stripping mechanism and doctor bar means, are equally suited for use with inherently fluid adhesives requiring no heat. When using the latter type adhesive, it will be understood further that the thermostatic switches 146 and 164 will be rendered inoperative by suitably modifying the circuit, or removed from the machine, and the control of motor 50 will be effected directly and solely by switch 166, regardless of the temperature of the adhesive.

While the invention has been described and illustrated in its several preferred embodiments, it should be understood that the invention is not to be limited to the precise details herein illustrated and described since the same may be carried out in other ways falling within the scope of the invention as claimed.

We claim:

1. A machine for applying spaced stripes of fluid adhesive to one surface of sheet-like material comprising in combination, a reservoir for adhesive material, a grooved distributor roll having annular ridges therebetween of uniform diameter and uniformly spaced axially, means rotatably supporting said roll above said reservoir for coating of the periphery of said ridges of said roll with said adhesive material, means to guide sheet material susbstantially into contact with said ridges of said distributor roll for application of stripes of adhesive material therefrom to the lower surface of said sheet material, a rotatable pressure roll engageable with the upper surface of said sheet material in opposition to said distributor roll and having circular contact means of restricted width thereon spaced according to and in alignment with the grooves of said distributor roll and operable to press sheet material into contact with said distributor roll, stripping means comprising a series of parallel stiff wires positioned transversely to the axis of said distributor roll and respectively disposed at least partially within the grooves of said roll, said wires being arched upwardly uniformly and extending from the feeding to the exit sides of said roll and positioned substantially tangentially to the uppermost periphery of said roll relative to both said feeding and exit sides to insure separation of coated sheet material therefrom and projection of said material beyond the machine to facilitate the engagement of the leading edge thereof by an operator, and means operable to control the position of one of said rolls radially relative to the other roll to provide desired driving friction for sheet material when passing between said rolls.

2. The machine according to claim 1 in which the trailing ends of said wires have an offset extending downward below the level of the intermediate portions of said wires and spaced inwardly from the discharge ends thereof to permit the ejection of coated sheet-like material from the machine cleanly and out of contact with any portion of the machine upon which adhesive can accumulate.

3. The machine according to claim 1 including pivoted arms at opposite sides of the machine and rotatably supporting the opposite ends of said pressure roll for pressure by gravity against sheet material passing over said distributor roll, the mounting means for said arms being operable to permit limited independent movement thereof relative to each other, thereby permitting automatic adaptation of said pressure roll to different thicknesses of material.

4. The machine according to claim 3 including gears mounted at similar ends of said distributor and pressure rolls and intermeshing for the driving of one roll by the other, the length of the teeth of said gears being adequate to permit driving engagement therebetween while permitting limited separative movement of said rolls during adaption of the pressure roll to accommodate material of different thicknesses automatically, and stop means adjustably positionable for engagement by said arms to limit the movement of said pressure roll toward said distributor roll.

5. The machine according to claim 1 including frame means having spaced bars positioned fore and aft of said distributor roll and substantially parallel thereto, side bars rigidly connected to the ends of said spaced bars to form a rigid frame, and means on said spaced bars to which said wires are detachably connected.

6. The machine according to claim 5 in which pairs of said wires are connected together at one end and said connecting means on said bars receive the ends of said wires when snapped therebeneath.

7. The machine according to claim 1 further including a doctor blade formed from synthetic resin of limited flexibility and positioned above the adhesive level in said reservoir and adjacent the upwardly movable side of said distributor roll and including yieldable teeth complementary to and projecting into the grooves of said distributor roll, the yieldability of said teeth permitting automatic adaptability thereof to said grooves regardless of expansion and contraction of said distributor roll, a supporting bar extending along one side of said distributor roll but spaced radially therefrom, a clamping bar engaging one surface of said doctor blade and clamping it against said supporting bar, and a deflecting plate extending downward and toward said reservoir from said clamping bar to direct excess adhesive removed from said distributor roll into said reservoir.

8. A machine for applying spaced stripes of fluid adhesive to one surface of sheet-like material comprising in combination, a grooved distributor roll rotatable about a horizontal axis and having evenly spaced annular ridges between said grooves, an electric motor connected to said roll to drive it, a reservoir for adhesive material having an elongated portion parallel to and coextensive in length with said distributor roll directly below the same and also having a shorter portion extending laterally from and substantially in the same plane as said elongated portion, electrical heating means directly below said elongated portion of said reservoir and substantially coextensive in length therewith and operable quickly to render the adhesive fluid by heat from said means, means rotatably supporting said roll above said elongated portion of said reservoir at an elevation suitable for at least said ridges on said roll to pass through heated adhesive in said reservoir for coating of the periphery of said ridges with said adhesive material, means to guide sheet material to the periphery of said ridges of said distributor roll for application of stripes of adhesive material therefrom to the lower surface of said sheet material, a rotatable pressure roll engageable with the upper surface of said sheet material in opposition to said distritbutor roll and having a series of circular contact means of restricted width thereon spaced according to and in alignment with the grooves of said distributor roll and operable to press said sheet material into contact with the ridges on said distributor roll, and a circuit to supply current to said motor and heating means and positioned principally in concealed manner beneath said reservoir, said circuit including a thermostatic switch having a heat-responsive portion positioned in direct contact with the lower surface of said offset portion of said reservoir spaced from said longitudinal portion and arranged to remain open until the heat of said adhesive in said offset portion of said reservoir reaches a predetermined amount before operation of said motor is possible and said switch being spaced sufficiently from said elongated portion of said reservoir to insure initial fluidity of the adhesive in the elongated portion of said reservoir for distribution by said distributor roll before such operation of said motor is possible to drive said roll.

9. The machine according to claim 8 in which said reservoir and distributor roll are formed from material of higher thermal conductivity than iron and said reservoir includes depending wall-like means integral therewith and substantially surrounding said heating means to enhance the efficiency of the heating of adhesive in said reservoir by said heating means.

References Cited

UNITED STATES PATENTS

| | | | |
|---|---|---|---|
| 853,480 | 5/1907 | Smith | 118—245 |
| 959,986 | 5/1910 | Zapf | 118—5 |
| 1,099,551 | 6/1914 | Keith | 118—250 |
| 1,196,914 | 9/1916 | Weiss | 118—221 |
| 1,961,829 | 6/1934 | Rutkoskie et al. | 118—5 |
| 2,270,038 | 1/1942 | Corbin | 118—101 X |
| 2,397,853 | 4/1946 | Gist | 118—261 X |
| 2,503,694 | 4/1950 | Voorhies | 118—249 |
| 2,754,796 | 7/1956 | Faulkner et al. | 118—44 |
| 2,965,066 | 12/1960 | Paulsen | 118—5 |
| 3,154,434 | 10/1964 | Rosenthal | 118—245 |

CHARLES A. WILLMUTH, *Primary Examiner.*

L. G. MACHLIN, *Assistant Examiner.*